United States Patent [19]

Fischer

[11] Patent Number: 4,648,767

[45] Date of Patent: Mar. 10, 1987

[54] FASTENING ELEMENT

[76] Inventor: Artur Fischer, Weinhalde 14 - 18, D 7244 Waldachtal 3/Tumlingen, Fed. Rep. of Germany

[21] Appl. No.: 817,045

[22] Filed: Jan. 8, 1986

[30] Foreign Application Priority Data

Jun. 29, 1985 [DE] Fed. Rep. of Germany ....... 3523418
Jul. 26, 1985 [DE] Fed. Rep. of Germany ....... 3526784

[51] Int. Cl.$^4$ ............................................ F16B 13/06
[52] U.S. Cl. ...................................... 411/60; 52/705
[58] Field of Search ...................... 52/705; 411/15–18, 411/24, 44, 45, 54, 55, 57, 61, 70, 7 B, 60

[56] References Cited

U.S. PATENT DOCUMENTS 806,407 12/1905 Farrington ............................. 52/705
3,014,398 12/1961 Engle ..................................... 411/15
3,921,496 11/1975 Helderman ............................. 411/17

FOREIGN PATENT DOCUMENTS 698307 10/1953 United Kingdom .................. 411/24

Primary Examiner—James L. Ridgill, Jr.
Attorney, Agent, or Firm—Michael J. Striker

[57] ABSTRACT

A fastening element is insertable into a hole of a structure for fastening an object to the structure and has a shaft having a forward smaller cross-sectional thickness portion, an expandable sleeve fitted over the smaller shaft portion, a holding member for holding the object at the rear end of the shaft and an expanding member for expanding the sleeve at the forward end of the shaft. The expandable sleeve is resilient and elastically deformable radially, has an external diameter larger than the maximum thickness of the shaft and has an internal diameter larger than the cross-sectional thickness of the portion of the shaft over which it is fitted. When inserted, the expandable sleeve is secured elastically against the internal wall of the drilled hole and if a tensile force is applied, the sleeve is pressed against the internal wall by the expanding member. The resilient force of the expandable sleeve enables the sleeve to adapt itself to different drilled hole diameters within the range of drilled hole tolerances. The expandable sleeve can even adapt itself to subsequent changes in the drilled hole, such as those resulting from the formation of cracks.

18 Claims, 3 Drawing Figures

FASTENING ELEMENT

BACKGROUND OF THE INVENTION

The present invention relates generally to a fastening element insertable into a hole of a structure, for fastening an object to the structure.

The foregoing fastening element is the type having a shaft that has a smaller cross-sectional thickness along a portion of its length by the forward end than that by the rear end, an expandable sleeve which is fitted over that smaller portion of the shaft, means for holding an object at the rear end of the shaft, and means for expanding the sleeve at the forward end of the shaft.

Fastening is accomplished by inserting the fastening element into a hole and then driving the sleeve onto an expansion element, such as an expansion cone, to tighten the hold.

In the case of known fastening elements, a shaft is fitted with an expandable sleeve over that portion of the shaft having the smaller cross-section and an expander cone is provided at the end of that shaft portion. The expandable sleeve, however, is in the form of two shell-segments, which are connected together on the shaft portion. Alternatively, the expandable sleeve is continuously slotted, which, for the purpose of fitting onto a shaft, is bent open to an appropriate width and bent together again.

In addition, the prior art requires that the expandable sleeve be anchored initially in the drilled hole of an anchoring substrate so that an expander cone can thereafter penetrate into the sleeve and thereby enlarge it when a tensile force acts on the expander cone. Protrusions are arranged on the expandable sleeve to project beyond the diameter of the sleeve so as to press into the drilled hole and provide the necessary anchoring. This manner of attachment of the expandable sleeve into the drilled hole renders the fastening element very sensitive to drilled hole tolerances.

Problems have arisen with both small and large bore drilled holes. In the case of small bore drilled holes, the protrusions press the expandable sleeve so securely into the smaller cross-sectional portion of the shaft that penetration of the expandable sleeve by the cone is, in certain circumstances, no longer possible. In the case of large bore drilled holes, the fastening of the expandable sleeve in the drilled hole may be so slight that, when a load is applied, the sleeve is moved out of the drilled hole together with the cone. The same problem occurs when an initially suitable drilled hole subsequently enlarges because of a crack breaking into the bore. The formation of cracks must be taken into consideration, especially to make the fastening element suitable for the tension zone.

Furthermore, expandable sleeves of soft steel are used in known fastening elements, so that an inelastic expansion occurs in these sleeves under tensile loading. As a consequence, no adjustment of the expandable sleeve can take place, which may result in a loosening and a loss in holding capacity when conditions change, such as when there is a formation of cracks in the region of the drilled hole or when there are loading changes.

SUMMARY OF THE INVENTION

It is the object of the present invention to provide a fastening element insertable into a hole of an structure for fastening an object to the structure to ensure a secure fastening in the tension zone of the structure.

In keeping with this object, and others which will become apparent hereafter, one aspect of the invention resides, briefly stated, in an expandable sleeve that can adapt itself to subsequent changing conditions, such as when cracks develop around a drilled hole.

The expandable sleeve is formed as a resilient sleeve, which is elastically deformable radially, having an external diameter larger than the maximum thickness of the shaft. The external diameter of the shaft is therefore larger than the internal diameter of the drilled hole and is selected such that a secure holding is always provided when the fastening element is driven into the drilled hole, no matter what the drilled hole tolerances may be. When the fastening element is driven in, the expandable sleeve is elastically compressed together to the size of the drilled hole, causing the sleeve to press with resilient force against the internal wall of the hole.

The internal diameter of the sleeve is larger than the cross-sectional thickness of the portion of the shaft upon which it is fitted so as to form a space surrounding that portion of the shaft. The size of this space must be large enough so that the expandable sleeve can be compressed together, at least to the size of the maximum external diameter of the shaft, to fit into the hole. If the drilled hole tolerances are such that the shaft is not secured in the hole, even for small bore drilled holes, then only the friction resulting from the resilient force exerted by the expandable sleeve on the internal wall of the drilled hole needs to be overcome when driving in the fastening element.

The expandable sleeve may also be formed as a slotted tube.

In a further embodiment of the invention, the thickness of the smaller cross-sectional portion of the shaft, upon which the expandable sleeve is fitted, is smaller than the internal diameter of the expandable sleeve in a compressed condition in the hole. In this manner, there will be space available between the expandable sleeve internal wall and the shaft portion over which the sleeve is fitted. Therefore, in the event the drilled hole is crooked, the shaft portion can bend to enable an expander at the forward end, such as an expander cone, to lie uniformly against the expandable sleeve during tensile loading. As a consequence, it is possible to achieve a uniform introduction of expansion forces into the expandable sleeve, producing a corresponding uniform distribution of securing forces in the drilled hole. When there is such space between the internal wall of the sleeve and the shaft portion over which the sleeve is fitted, the sleeve can be considered to be a pendulous expandable sleeve.

In another embodiment of the invention, the expandable sleeve has a continuous longitudinal slot, The width of the slot can be less than the cross-sectional thickness of the shaft portion over which it is to be fitted to facilitate lateral pushing of the sleeve onto this shaft portion by slight elastic expansion, with the profile of the expandable sleeve springing back to its original size thereafter.

In yet another embodiment of the invention, the portion of the shaft over which the sleeve is to be fitted can have a circular cross-section. Preferably, however, this portion of the shaft has a flat stem with a wedge-shaped cross-section, having a first side and a second side which is opposite from the first side, the first side being wider than the width of the slot and the second side being at most the same width as that of the slot. This sleeve, when composed of spring steel, can be relatively easily pushed on the wedge-shaped portion by pushing the sleeve over the second side initially and continuing over the remaining sides.

In an additional embodiment of the invention, the means for expanding the sleeve at the forward end includes an expander cone. Preferably, the expander cone is pressure-molded in order to provide an optimum gliding surface for an expandable sleeve composed of hardened steel. Further, the shaft portion over which the sleeve is to be fitted and the expander cone can be composed of unhardened steel and the expandable sleeve can be composed of hardened steel or tempered. With these materials, the expanding and securing actions of the expandable sleeve ensures that the material of the expandable sleeve will not distort, even under high tensile forces.

Through these measures, a fastening element is produced in which, even under existing tensile loading, the expandable sleeve adapts to cling itself to a drilled hole which may even have subsequently enlarged because of a crack.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
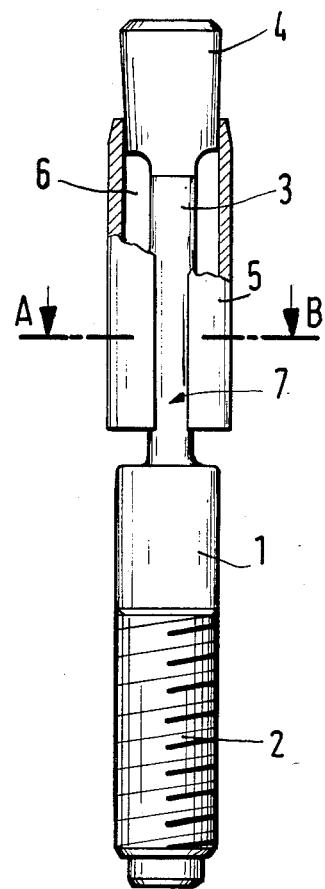
FIG. 1 is a sectional vertical view of the fastening element having an expandable sleeve in the unloaded state, the element having a threaded rear portion.

Referring now to the drawings, a fastening element according to the invention includes a shaft 1 which has, in its forward region, a smaller cross-sectional thickness portion 3 by the forward end. Expansion means are provided at the forward end by an expander cone 4. An expandable sleeve 5 is fitted to surround the portion 3, the sleeve having radial and axial play. FIG. 1 also shows an embodiment in which the rear end portion of the shaft 1 has a threaded portion 2 for tensioning an object.

Figure 2:
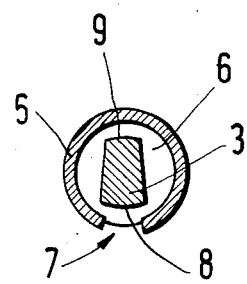
FIG. 2 is a cross-sectional view of the fastening element along line A-B of FIG. 1.

In a preferred embodiment, shown in FIG. 2, the portion 3 forms a wedge-shaped flat stem, the maximum thickness or greatest width of which is smaller than the internal diameter of the expandable sleeve 5, so that a space 6 is formed between the portion 3 and the expandable sleeve 5. The expandable sleeve 5, therefore, is loosely mounted, in what can be described as a pendulum-type arrangement.

Another embodiment shows the expandable sleeve 5 having a continuous longitudinal slot 7, the gap width of which is narrower than the wider side 8 and wider than the narrower side 9 of the wedge-shaped profile of portion 3. This results in a secure fastening of the expandable sleeve 5 in the region of portion 3. The expandable sleeve is pushed over the wedge-shaped portion 3 by placing the longitudinal slot 7 over the narrower side 9 and then pushing from that side over the portion 3 until the expandable sleeve 5 can spring back behind the wider side 8 to its original diameter.

The external diameter of the fastening element is essentially uniform over its entire length, except that the external diameter of the expandable sleeve 5 is actually slightly larger because it clamps the fastening element in place. When the fastening element is driven into a drilled hole, the expandable sleeve 5 is compressed together to the size of the diameter of the bore. The sleeve is therefore held in the drilled hole so securely that if a tensile loading acts on the rear end of the fastening element, the expander cone 4 is pulled into the expandable sleeve 5, causing the sleeve 5 to be pressed outwards in the drilled hole against the wall of the drilled hole. Under tensile loading, therefore, the expandable sleeve 5 secures its hold by itself.

Figure 3:
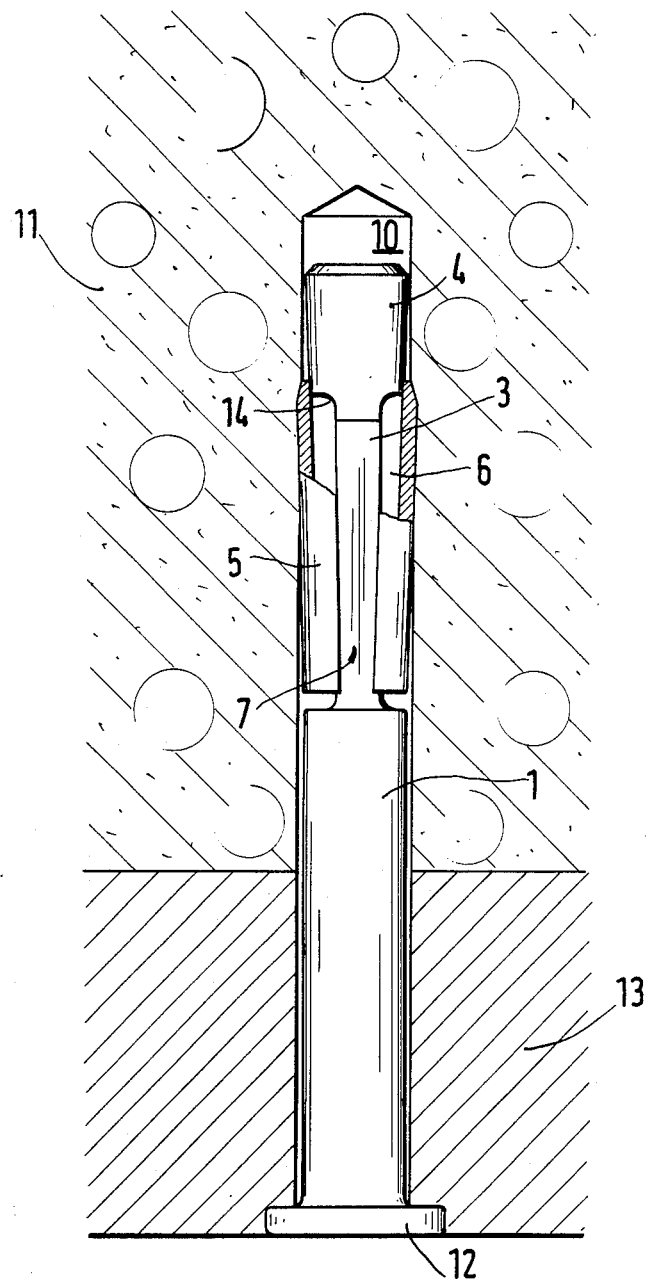
FIG. 3 is a sectional vertical view of the fastening element inserted into a drilled hole, the element having a nail head at the rear.

FIG. 3 depicts a fastening element acting as an expandable nail that is tensioned in a drilled hole 10 in a concrete member 11. A nail head 12 is molded onto the rear end of the fastening element, the head 12 holding an object 13 to be fastened against the concrete member 11.

In a transition zone 14, situated between the expander cone 4 and the wedge profile of the portion 3, the sides 8 and 9 of the wedge-shaped profile continue conically to merge with the conical surface of the expander cone 4.

The resilient action of the expandable sleeve 5 causes a clamping to occur such that the expandable sleeve becomes unshakeable in the drilled hole. The clamping force increases with the tensile force so that previous anchoring of the fastening element in the drilled hole is not needed to produce a secure fastening. When changes occur in the drilled hole, the expandable sleeve 5 adapts itself resiliently so that the desired clamping action is always achieved. The space 6 between the shaft portion 3 and the expandable sleeve 5 allows the expandable sleeve 5 to adapt itself to the course of the wall of the drilled hole independent of the portion 3, even where the drilled hole 10 is crooked. Consequently, uniform clamping in the region of the expander cone 4 and thereby a uniform introduction of force into the concrete member 11 is achieved, producing an especially secure clamping capable of high loading.

It will be understood that each of the elements described above, or two or more together, may also find a useful application in other types of fastening elements differing from the types described above.

While the invention has been illustrated and described as embodied in a fastening element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fastening element insertable into a hole of a structure for fastening an object to the structure, comprising:

a shaft having a forward end a rear end, said shaft having a maximum thickness and a portion by said forward end with a smaller cross-sectional thickness than said maximum thickness;

means for holding an object at said rear end of said shaft;

an expandable sleeve fitted over at least said portion of said shaft, said sleeve having an internal and an external diameter; and means for expanding said sleeve at said forward end of said shaft, said sleeve being formed as a resilient sleeve which is elastically deformable radially, said external diameter of said sleeve being larger than said maximum thickness of said shaft and said internal diameter of said sleeve being larger than said cross-sectional thickness of said portion of said shaft so as to form a space surrounding said portion of said shaft free of any additional member, said sleeve being compressible into said space, said sleeve being compressed and clinging to the hole when the fastening element is inserted into the hole, said sleeve having resiliency such that even if cracks form in the hole after the fastening element is inserted into the hole, said sleeve continues to cling to the drilled hole.

2. Fastening element as defined in claim 1, wherein said sleeve has a predetermined internal diameter while in a compressed condition in the hole, said cross-sectional thickness of said portion of said shaft being smaller than said internal diameter of said sleeve in the compressed condition.

3. Fastening element as defined in claim 1, wherein said sleeve is composed of hardened steel.

4. Fastening element as defined in claim 1, wherein said sleeve is composed of tempered steel.

5. Fastening element as defined in claim 1 wherein said portion of said shaft is composed of unhardened steel.

6. Fastening element as defined in claim 1, wherein said holding means includes a threaded portion at said rear end of said shaft and arranged to be threaded into the object to be fastened so as to hold the object.

7. Fastening element as defined in claim 1, wherein said sleeve is formed as a slotted tube.

8. Fastening element as defined in claim 1, wherein said sleeve has a continuous longitudinal slot of a predetermined width.

9. Fastening element as recited in claim 8, wherein said width of said slot is less than said cross-sectional thickness of said portion of said shaft to facilitate lateral pushing of said sleeve onto said portion of said shaft through elastic expansion.

10. Fastening element as defined in claim 8, wherein said portion of said shaft has a circular cross-sectional shape.

11. Fastening element as defined in claim 8, wherein said portion of said shaft has a wedge-shaped cross-section, said portion having a first side and a second side which is opposite from said first side, said first side being wider than said width of said slot and said second side being at most the same width as said width of said slot.

12. Fastening element as defined in claim 11, wherein said expanding means has a conical surface, said first side and said second side of said wedge-shaped cross-section having a conical-shaped section merging into said conical surface of said expanding means.

13. Fastening element as defined in claim 1, wherein said holding means includes a nail head provided on said rear end of said shaft and arranged to press the object to be fastened against the structure.

14. Fastening element as defined in claim 13, wherein said nail head is a head molded on said rear end of said shaft to form one piece therewith.

15. Fastening element as defined in claim 1, wherein said sleeve expanding means at the forward end of the shaft includes an expander cone.

16. Fastening element as defined in claim 15, wherein said expander cone is a pressure-molded expander cone.

17. Fastening element as defined in claim 15, wherein said expander cone is composed of unhardened steel.

18. A fastening element insertable into a hole of a structure for fastening an object to the structure, comprising:

a shaft having a forward end a rear end, said shaft having a maximum thickness and a portion by said forward end with a smaller cross-sectional thickness than said maximum thickness;

means for holding an object at said rear end of said shaft;

an expandable sleeve fitted over at least said portion of said shaft, said sleeve having an internal and an external diameter; and means for expanding said sleeve at said forward end of said shaft including an expander cone, said sleeve being formed as a resilient sleeve which is elastically deformable radially, said external diameter of said sleeve being larger than said maximum thickness of said shaft and said internal diameter of said sleeve being larger than said cross-sectional thickness of said portion of said shaft so as to form a space surrounding said portion of said shaft free of any additional member, said sleeve being compressible into said space, said sleeve being compressed and clinging to the hole when the fastening element is inserted into the hole, said sleeve having resiliency such that even if cracks form in the hole after the fastening element is inserted into the hole, said sleeve continues to cling to the drilled hole, said sleeve having a predetermined internal diameter while in a compressed condition in the hole, said cross-sectional thickness of said portion of said shaft being smaller than said internal diameter of said sleeve in the compressed condition, said sleeve having a continuous longitudinal slot of a predetermined width, said width of said slot being less than said cross-sectional thickness of said portion of said shaft to facilitate lateral pushing of said sleeve onto said portion of said shaft through elastic expansion, said sleeve being composed of hardened steel.

* * * * *